Patented Apr. 28, 1925.

1,535,709

UNITED STATES PATENT OFFICE.

LEVIS MILLER BOOTH, OF PLAINFIELD, NEW JERSEY.

COAGULANT FOR PURIFYING WATER AND PROCESS OF PURIFYING WATER THEREWITH.

No Drawing.   Application filed October 29, 1918.   Serial No. 260,171.

*To all whom it may concern:*

Be it known that I, LEVIS MILLER BOOTH, a citizen of the United States, residing at 975 Cedar Brook Road, Plainfield, county of Union, and State of New Jersey, have invented certain new and useful Improvements in Coagulants for Purifying Water and Process of Purifying Water Therewith.

The objects of my invention are to provide a coagulant for purifying water which contains silt, mud, coloring matter or other impurities and to leave the water when purified and clarified, slightly alkaline. The other objects of my invention will more fully appear in the following specification.

Heretofore the purification of water has been accomplished by the use of metallic sulphates, usually aluminum sulphate or iron sulphate, whose chemical activity and consequent efficiency was dependent upon the alkalinity of the water to be treated as manifested by the presence of alkaline salts, usually alkaline salts of calcium, magnesium or sodium. The percentage of salts in waters to be treated vary greatly from time to time. When water to be treated was markedly lacking in alkalinity it was customary to supply a solution of sodium carbonate or other suitable alkali which was fed or introduced into the water separately. When the process was continuous this involved apparatus for feeding the metallic sulphate and separate apparatus for feeding the alkaline substance. When the process was intermittent it involved accurately measuring and feeding the correct quantity of each of the reagents. When the metallic sulphate was supplied in such quantity that it did not completely react with the alkaline substance supplied or contained in the water to be treated, either because the water did not contain a sufficient quantity of alkali or because a sufficient quantity of alkali was not supplied, the treated water was corrosive in its action and damage to the apparatus and to the product in connection with which the water was used resulted, due to the acidity of the undecomposed metallic sulphate remaining in the water, and water so treated was unsuitable for washing and for numerous other requirements.

My invention is an improvement and simplification of the above process and is designed to eliminate the difficulties mentioned. I mix with a metallic sulphate such a quantity of an alkaline substance, which when in a dry state will not react therewith, as will, together with the alkaline content of the water, insure a complete precipitation of the metallic portion of the metallic sulphate when applied to the water to be purified. My coagulant is preferably applied to the water in powdered form. The ingredients may be powdered before mixing, or mixed and then powdered. I have manufactured an aluminum salt suitable for this purpose by crushing into fine particles 3.82 parts of nitre cake the principal ingredient of which is acid sodium sulphate, $NaHSO_4$, and mixing the same with one part of crushed bauxite, a mineral consisting of approximately fifty per centum of alumina $Al_2O_3$ and then heating until sulphate of aluminum $Al_2(SO_4)_3$ is formed. The resultant product, is then reduced to a powder. It is apparent that a similar product may be produced with other acid bearing salts and other aluminum bearing minerals, such as clay.

I have obtained satisfactory results by mixing 100 parts of this product with from 5 to 20 parts of ground lime stone, the ratio of ground lime stone depending upon the alkalinity of the water to be treated. These ingredients I mix thoroughly in a dry state and then add to the water to be treated, as required.

While I prefer to use ground lime rock because it is readily available in most sections at a moderate cost, I may use any commercial calcium carbonate as for instance, precipitated calcium carbonate or calcium carbonate mingled with magnesium carbonate or any other impurity which is frequently present in ground lime rock and which will not react with the metallic salt in a dry state.

After the coagulation the impurities may be removed by sedimentation or filtration, or both.

The coagulant and process of purifying water herein described is particularly adapted for purifying water which contains a small amount of carbon dioxide or of calcium bicarbonate or of magnesium bicarbonate. The amounts of carbon dioxide or of such bicarbonates in the waters to be purified by this process may be very small in quantity, the amount required being only the small quantity necessary to initiate the following chemical reaction.

Assuming that the mixture which I employ to produce the coagulation consists of calcium carbonate, $CaCO_3$, and aluminum sulphate $Al_2(SO4)_3.18H_2O$, the reactions will be as follows:

1. A portion of the aluminum sulphate will react with the calcium bicarbonate in the water producing precipitated aluminum hydroxide: $Al_2(SO_4)_3.18H_2O+3Ca(HCO_3)_2 = Al_2(OH)_6+3CaSO_4+6CO_2+18H_2O$.

2. The carbon dioxide, $CO_2$ will, in the presence of water and the calcium carbonate, form calcium bicarbonate: $3CaCO_3+6CO_2+3H_2O=3Ca(HCO_3)2$.

The second reaction results in the formation of the same amount of calcium bicarbonate which was taken from the water to produce the aluminum hydroxide precipitate formed in the first reaction and this calcium bicarbonate again institutes a reaction similar to the first reaction, after which the second reaction takes place and the cycle is continuous until all of the aluminum sulphate has reacted.

Having described my invention, I claim:

1. A dry coagulant for purifying water composed of a mixture of dry mono-carbonate of calcium and dry metallic sulphate adapted to be fed as a mixture in the dry state to the water.

2. A dry coagulant for purifying water composed of a mixture of mono-carbonate of calcium and metallic sulphate, the said materials being mixed and maintained in a dry condition preventing premature reaction, and adapted to be fed in the dry state to the water to be purified.

3. A dry re-agent for purifying water comprising a mixture of commercial mono-carbonate of calcium and a metallic sulphate both in a dry state and which will not re-act together when in a dry state.

4. A dry re-agent for purifying water comprising a mixture of commercial mono-carbonate of calcium and a metallic sulphate both in a dry state and which will not re-act together when in a dry state; the ratio of the ingredients being such that the quantity of carbonate in the mixture is sufficient to completely re-act with the metallic portion of the metallic sulphate.

5. A dry re-agent for purifying water comprising a mixture of commercial mono-carbonate of calcium and a metallic sulphate both in a dry state and which will not re-act together when in a dry state; the ratio of the ingredients being such that the quantity of carbonate in the mixture together with the alkalinity in the water to be purified is sufficient to completely re-act with the metallic portion of the metallic sulphate.

6. A dry re-agent for purifying water comprising a mixture of commercial mono-carbonate of calcium and a metallic salt both in a dry state and which will not react together when in a dry state.

7. A dry re-agent for purifying water comprising a mixture of commercial mono-carbonate of calcium and a metallic salt both in a dry state and which will not re-act together when in a dry state; the ratio of the ingredients being such that the quantity of carbonate in the mixture is sufficient to completely re-act with the metallic portion of the metallic salt.

8. A dry re-agent for purifying water comprising a mixture of commercial mono-carbonate of calcium and a metallic salt both in a dry state and which will not re-act together when in a dry state; the ratio of the ingredients being such that the quantity of carbonates in the mixture, together with the alkalinity of the water to be purified is sufficient to completely re-act with the metallic portion of the metallic salt.

9. The process of purifying water which comprises mingling commercial mono-carbonate of calcium with an acid metallic salt which will not re-act therewith when in a dry state and then feeding the dry mixture to the water to be treated.

10. The process of purifying water which comprises mingling commercial mono-carbonate of calcium with an acid metallic salt which will not re-act therewith when in a dry state but will re-act in the presence of water.

11. The process of purifying water which comprises mingling commercial mono-carbonate of calcium with an acid metallic salt which will not re-act therewith when in a dry state but will re-act in the presence of water, the quantity of carbonates in the mixture being sufficient to completely re-act with the acid metallic salt and then feeding the dry mixture to the water to be treated.

Signed at New York city, in the county of New York, and State of New York, this 17th day of July, 1918.

LEVIS MILLER BOOTH.

Witnesses:
 MARGARET A. HECK,
 EDWARD H. WILSON.